(12) United States Patent
Jones

(10) Patent No.: US 6,649,293 B1
(45) Date of Patent: Nov. 18, 2003

(54) HEATABLE END PLATE, FUEL CELL ASSEMBLY, AND METHOD FOR OPERATING A FUEL CELL ASSEMBLY

(75) Inventor: Daniel O. Jones, Glenville, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/552,452

(22) Filed: Apr. 18, 2000

(51) Int. Cl.$^7$ .................................................. H01M 8/04
(52) U.S. Cl. ........................................... 429/26; 429/39
(58) Field of Search ................................ 429/26, 34–39

(56) References Cited

U.S. PATENT DOCUMENTS

| | | | | |
|---|---|---|---|---|
| 4,217,401 A | * | 8/1980 | Pellegri et al. ................ | 429/39 |
| 5,047,298 A | * | 9/1991 | Perry, Jr. et al. | |
| 5,132,174 A | | 7/1992 | Romanowski et al. ......... | 429/26 |
| 5,503,944 A | | 4/1996 | Meyer et al. ................. | 429/13 |
| 5,798,186 A | * | 8/1998 | Fletcher et al. ............... | 429/13 |
| 5,910,378 A | * | 6/1999 | Debe et al. .................... | 429/42 |
| 6,048,635 A | | 4/2000 | Guthrie ........................ | 429/34 |
| 6,228,518 B1 | * | 5/2001 | Kindler | |

* cited by examiner

*Primary Examiner*—Susy Tsang-Foster
(74) *Attorney, Agent, or Firm*—Heslin Rothenberg Farley & Mesiti P.C.

(57) ABSTRACT

In one embodiment, an outermost heatable end plate for compressing a fuel cell stack. The outermost heatable end plate includes a body having at least one flow channel formed in the surface of the body through which coolant is passed. In another embodiment, an outermost heatable end plate includes a body and a heating element. The outermost heatable end plates inhibit condensation of water from a humidified reactant passing through an opening in the body of the plate and/or inhibit heat loss from the ends of the fuel cell stack. The opening of the outermost heatable end plate, for example, forms a portion of a manifold for conducting the reactant to the fuel cell stack.

20 Claims, 4 Drawing Sheets

HEATABLE END PLATE, FUEL CELL ASSEMBLY, AND METHOD FOR OPERATING A FUEL CELL ASSEMBLY

TECHNICAL FIELD

This invention relates generally to fuel cell assemblies, and more particularly to end plates for compressing a fuel cell stack therebetween.

BACKGROUND INFORMATION

Fuel cells electrochemically convert reactants, e.g., fuel and oxidant, to electricity. Unlike a battery, which contains a set amount of chemicals for generating electricity and which stops delivering electricity once the chemicals are consumed, a fuel cell can deliver electricity continuously so long as it receives fuel and oxidant. Fuel cells are generally categorized according to the type of electrolyte (e.g., solid oxide, molten carbonate, alkaline, phosphoric acid, or solid polymer) used to accommodate ion transfer during operation.

For example, a solid polymer electrochemical fuel cell generally comprises an MEA (membrane electrode assembly). The MEA includes a solid polymer membrane or PEM (proton exchange membrane) sandwiched between and in contact with two electrodes (one called an anode and the other called a cathode) made of porous, electrically conducting sheet material. The electrodes are typically made from carbon fiber paper or cloth. In addition, at the interface of the electrode and membrane, i.e., sandwiched therebetween, is a platinum-based catalyst layer to facilitate the electrochemical reaction.

Typically, the MEA is placed between two electrically conductive graphite plates which have one or more reactant flow passages impressed on the surface. The reactant flow passages direct the flow of a reactant to the electrode.

Fuel, such as humidified hydrogen, is supplied to the anode side of the fuel cell where the hydrogen reacts at the platinum-based anode catalyst layer to separate into hydrogen ions and electrons, as follows (anode reaction):

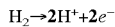

$$H_2 \rightarrow 2H^+ + 2e^-$$

The solid polymer membrane permits the passage of protons (i.e., $H^+$ ions) from the anode side of the fuel cell to the cathode side of the fuel cell while preventing passage therethrough of reactants (e.g., hydrogen and air/oxygen gases). The electrons migrate via an external circuit in the form of electricity.

Oxidant, such as humidified oxygen or air, is supplied to the cathode side of the fuel cell where it reacts at the platinum-based cathode catalyst layer with the hydrogen ions that have crossed the membrane and the electrons from the external circuit to form liquid water as a reaction product, as follows (cathode reaction):

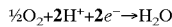

$$\tfrac{1}{2}O_2 + 2H^+ + 2e^- \rightarrow H_2O$$

Additional cells can be connected together in series to form a fuel cell stack having increased voltage and power output. Such a fuel cell stack is typically provided with inlets, outlets, and manifolds for directing the flow of reactants (as well as coolant, such as water) to the individual reactant flow plates, and assembled between a pair of thick rigid end plates. The edges of the end plates are bolted together to apply a compressive force on the fuel cell stack.

One problem with end plates, and in particular service end plate for conducing one or more humidified reactants to the fuel cell stack, is condensation of water from the one or more humidified reactants as it passes through one or more openings extending through the service end plate. A reduction in the water content of the humidified reactant fluids can lead to drying out of the proton exchange membrane, and thus, reduction in the electrical output of the fuel cell stack.

Another problem with a fuel cell assembly having end plates is the loss of heat from the ends of the fuel cell stack. This results in the temperature of the fuel cell stack not being constant across the length of the fuel cell stack and the ends of the fuel cell stack not being maintained at the designed operating temperature of the fuel cell stack.

There is a need for inhibiting condensation of water from the one or more humidified reactants passable through one or more openings extending through a service end plate and/or a need for inhibiting heat loss from the ends of the fuel cell stack.

SUMMARY OF THE INVENTION

The above-identified needs are met by in one aspect of the present invention, an outermost heatable end plate for use in compressing a fuel cell stack in a fuel cell assembly in which the outermost heatable end plate includes a monolithic body having at least one flow channel. The at least one flow channel includes an inlet portion which opens onto at least one of an Inlet coolant manifold extending through the fuel cell stack and an outlet coolant manifold extending through the fuel cell stack.

In a second aspect of the present invention, a fuel cell assembly includes a fuel cell stack, a first outermost heatable end plate attachable to a second end plate for compressing the fuel cell stack therebetween, and wherein the first outermost heatable end plate includes a first monolithic body having at least one first flow channel. The at least one first flow channel includes an inlet portion which opens onto at least one of an inlet coolant manifold extending through the fuel cell stack and an outlot coolant manifold extending through the fuel cell stack.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be understood from the following detailed description of preferred embodiments taken in conjunction with the accompanying drawings in which:

DETAILED DESCRIPTION OF THE PREFERRED EMBODIMENTS

Figure 1:
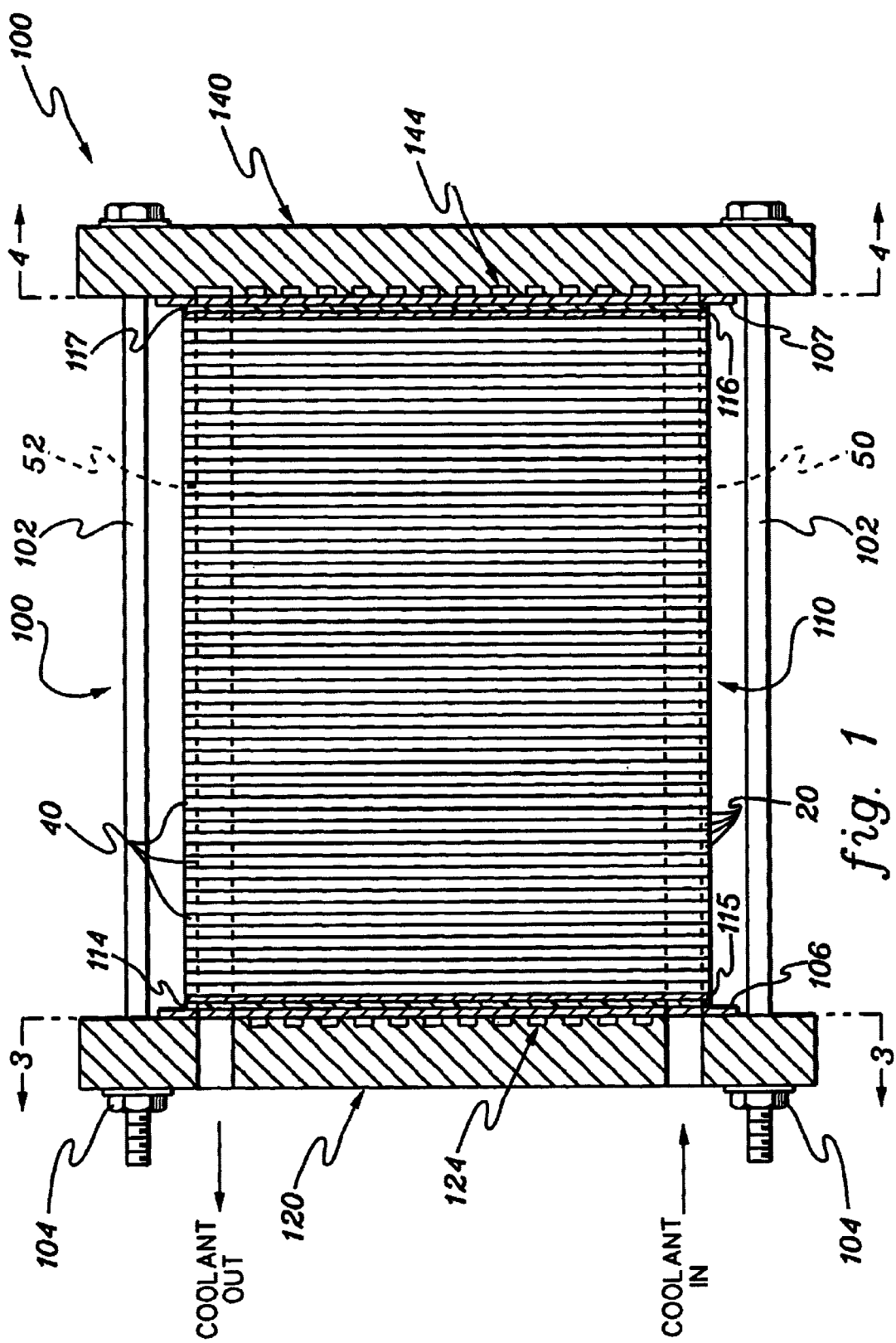
FIG. 1 is a side elevational view, in part cross-section, illustrating a fuel cell assembly having end plates in accordance with one embodiment of the present invention.

FIG. 1 illustrates one embodiment of a fuel cell assembly 100 according to the present invention. In this exemplary embodiment, fuel cell assembly 100 includes a fuel cell stack 110 compressed between a first or service heatable end plate 120 and a second or blind heatable end plate 140.

As described in greater detail below, heatable end plate 120 and heatable end plate 140 are desirably heated to inhibit condensation of water from the humidified reactants passing through heatable end plate 120 and/or to inhibit heat loss from the ends of fuel cell stack 110.

Fuel cell stack 110 desirably includes a plurality of fuel cells 20, and a plurality of cooling plates 40 interspersed between the plurality of fuel cells 20 and through which a coolant is recirculated to maintain fuel cell stack 110 at a generally constant operating temperature. Insulation layers 114 and 117, and current collector/conductor plates 115 and 116, are disposed between respective end plates 120 and 140 and the opposite ends of fuel cell stack 110. A plurality of structural members such as elongated bolts 102 and releasably attachable nuts 104 are employed to inhibit movement of end plate 120 away from end plate 140.

Figure 2:
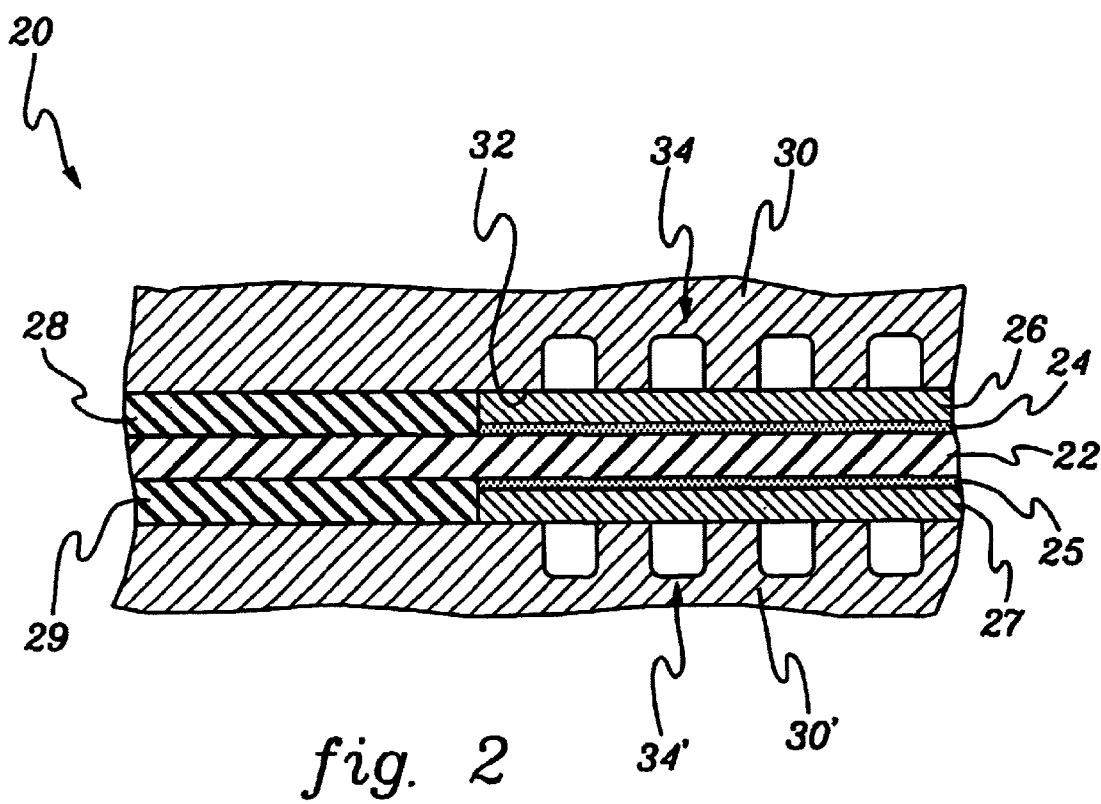
FIG. 2 is a cross-sectional view of one of the fuel cells of the fuel cell stack shown in FIG. 1.

With reference to FIG. 2, a typical fuel cell 20 may include a solid polymer membrane 22 or PEM (proton exchange membrane) such as a material manufactured by E. I. Du Pont de Nemours Company and sold under the trademark NAFION®. Catalysts 24 and 25 (e.g., platinum), which facilitate chemical reactions, are desirably applied to the anode and cathode sides, respectively, of the solid polymer electrolyte. Anode and cathode gas diffusion layers 26 and 27, which are formed from a resilient and conductive material such as carbon fabric or carbon fiber paper, are disposed on catalysts 24 and 25, respectively.

Exemplary fuel cell 20 further includes a first fluid flow plate 30 having a fluid flow surface 32 with a plurality of flow channels 34 thereon. Flow channels 34 receive and conduct a reactant through an inlet and out an outlet which are in fluid communication with and open onto corresponding passageways (not shown in FIG. 2), respectively, in fluid flow plate 30 which form respective portions of manifolds (not shown in FIG. 1) in fuel cell stack 110 (FIG. 1). Fluid flow plate 30 may be monopolar or bipolar.

Flow channel 34 carries a reactant, e.g., a fuel such as hydrogen, as well as a liquid, e.g., humidification. A second fluid flow plate 30', is essentially similar to first fluid flow plate 30, includes flow channels 34' for carrying a reactant, e.g., an oxidant such as air/oxygen as well as a liquid, e.g., humidification and/or product water.

Desirably, gaskets 28 and 29 are employed to seal the passageways forming the portions of the manifolds. Gaskets 28 and 29 may include a frame gasket made from a polytetrafluoroethylene (PTFE) material manufactured by E. I. Du Pont de Nemours Company and sold under the trademark TEFLON®. Alternatively, multiple O-ring gaskets may be employed.

With reference again to FIG. 1, fuel cell stack 110 may contain one or more PEM-type fuel cells 20. By connecting an external load (not shown) between electrical contacts (not shown) of current collector/conductor plates 115 and 116, one can complete a circuit for use of current generated by the one or more PEM-type fuel cells.

PEM-type fuel cell stack 110 is desirably suitably cooled to operate at a temperature between about 20 degrees Celsius (C.), i.e., ambient, and about 110 degrees C., and preferably between about 70 degrees C. and about 110 degrees C. In addition, in the fabrication of fuel cell assembly 100, fuel cell stack 110 typically has applied thereto a stack compression pressure of between about 25 psi (pounds per square inch) and about 1,000 psi, and preferably, between about 100 psi and about 600 psi.

Figure 3:
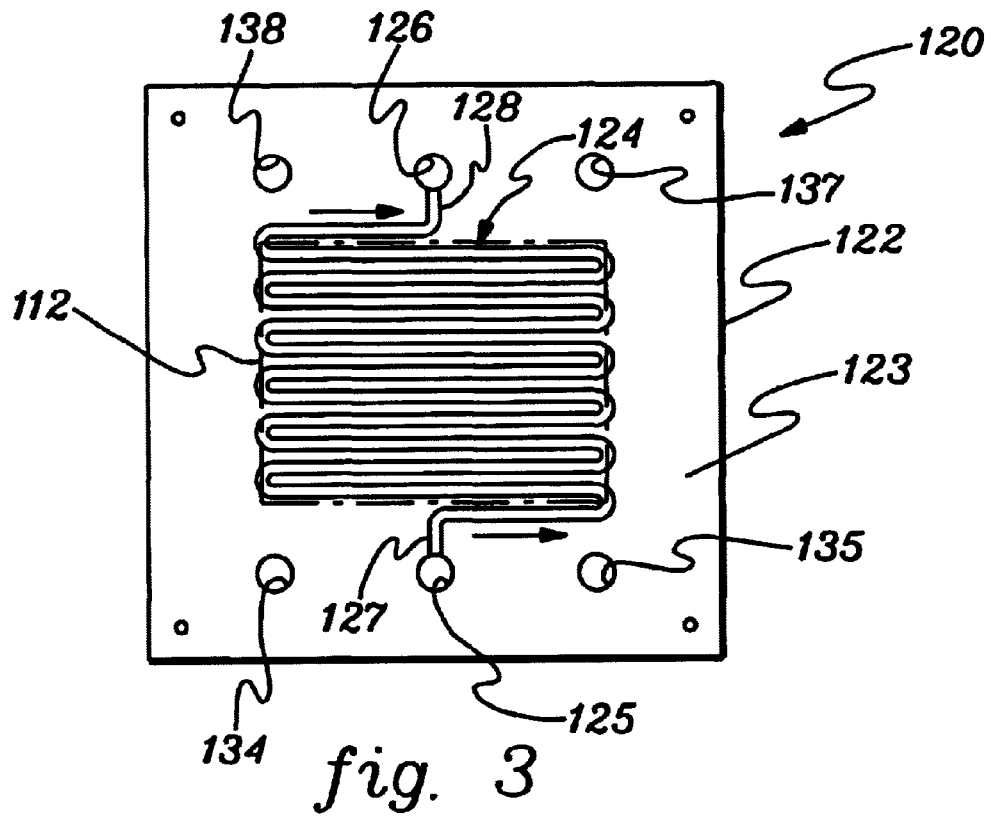
FIG. 3 is a view taken along line 3—3 of the service end plate of FIG. 1.

With reference still to FIG. 1 and as best shown in FIG. 3, service end plate 120 includes a body 122 having a surface 123 which is engageable with a first end of fuel cell stack 110 (FIG. 1). Body 122 of end plate 120 includes a first opening 134 extending therethrough for forming a portion of an inlet fuel manifold for conducting humidified fuel to fuel cell stack 110 (FIG. 1), and a second opening 135 extending therethrough for forming a portion of an inlet oxidant manifold for conducting humidified oxidant to fuel cell stack 110 (FIG. 1). In addition, a third opening 137 extends through body 122 for forming a portion of an outlet fuel manifold for conducting exhaust fuel from fuel cell stack 110 (FIG. 1), and a fourth opening 138 extends through body 122 for forming a portion of an outlet oxidant manifold for conducting exhaust oxidant from fuel cell stack 110 (FIG. 1).

Body 122 also includes a fifth opening 125 extending therethrough for forming a portion of an inlet coolant manifold 50 (FIG. 1) for conducting coolant to fuel cell stack 110 (FIG. 1) and a sixth opening 126 extending therethrough for forming a portion of an outlet coolant manifold 52 for conducting coolant from fuel cell stack 110 (FIG. 1). In addition, surface 123 includes at least one flow channel 124 having an inlet portion 127 which opens onto fifth opening 125 and an outlet portion 128 which opens onto sixth opening 126 for conducing coolant across surface 123 for heating end plate 120. Desirably, flow channel 124 extends over substantially an entire portion of surface 123 corresponding to an active or working area 112 of fuel cell stack 110 (FIG. 1).

Figure 4:
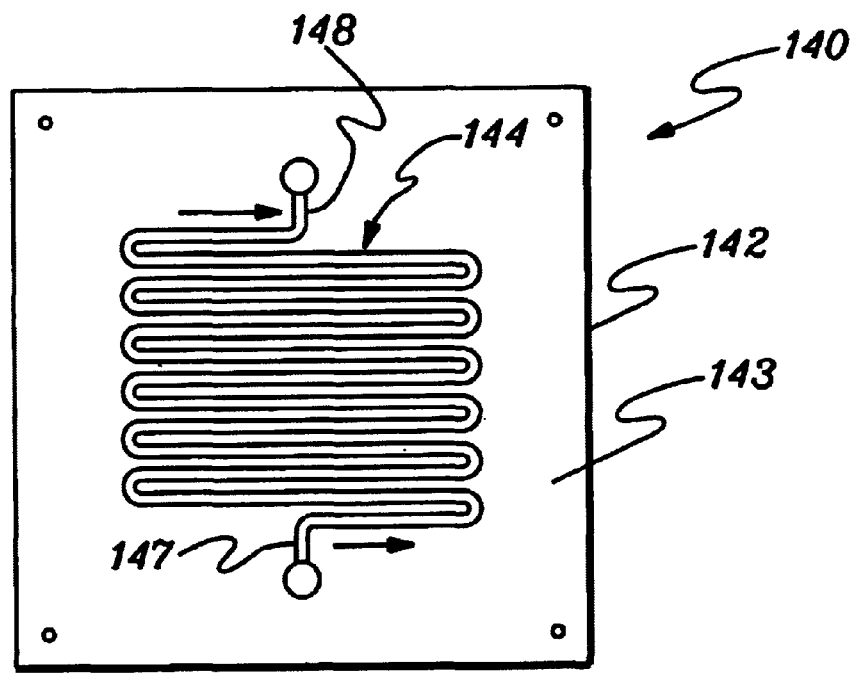
FIG. 4 is a view taken along line 4—4 of the blind end plate of FIG. 1.

As best shown in FIG. 4, end plate 140 includes a body 142 having a surface 143 which is engageable with an opposite second end of fuel cell stack 110 (FIG. 1). Surface 143 includes at least one flow channel 144 for heating end plate 140. Desirably, flow channel 144 extends over substantially an entire portion of surface 143 corresponding to the active or working area of fuel cell stack 110 and includes inlet and outlet portions 147 and 148 which open onto coolant manifolds 50 and 52, respectively, formed in fuel cell stack 110 (FIG. 1). Advantageously, the flow channels are formed or machined into the surface of the body so as to be integral with the body of the service or blind end plates.

With reference to service end plate 120 and as illustrated in FIG. 3, coolant in fifth opening 125 (which forms a portion of the inlet coolant manifold of the fuel cell stack) enters inlet portion 127 of flow channel 124, then travels through flow channel 124, and exits via outlet portion 128 through sixth opening 126 (which forms a portion of the outlet coolant manifold of the fuel cell stack). Similarly, with reference to blind end plate 140 and as illustrated in FIG. 4, coolant enters inlet portion 147 which opens onto a portion of the inlet coolant manifold of the fuel cell stack, then travels through flow channel 144, and exits via outlet portion 148 which opens onto a portion of the outlet coolant manifold of the fuel cell stack. With this configuration of the end plates, desirably the temperature of the coolant introduced into the fuel cell assembly is substantially equal to the operating temperature of the fuel cell stack, e.g., within a few degrees Celsius and desirably within one degree Celsius, so that both the fuel cell stack and the end plates or the desired surfaces and/or portions of the end plates are maintained at substantially the same temperature as the fuel cell stack.

Figure 5:
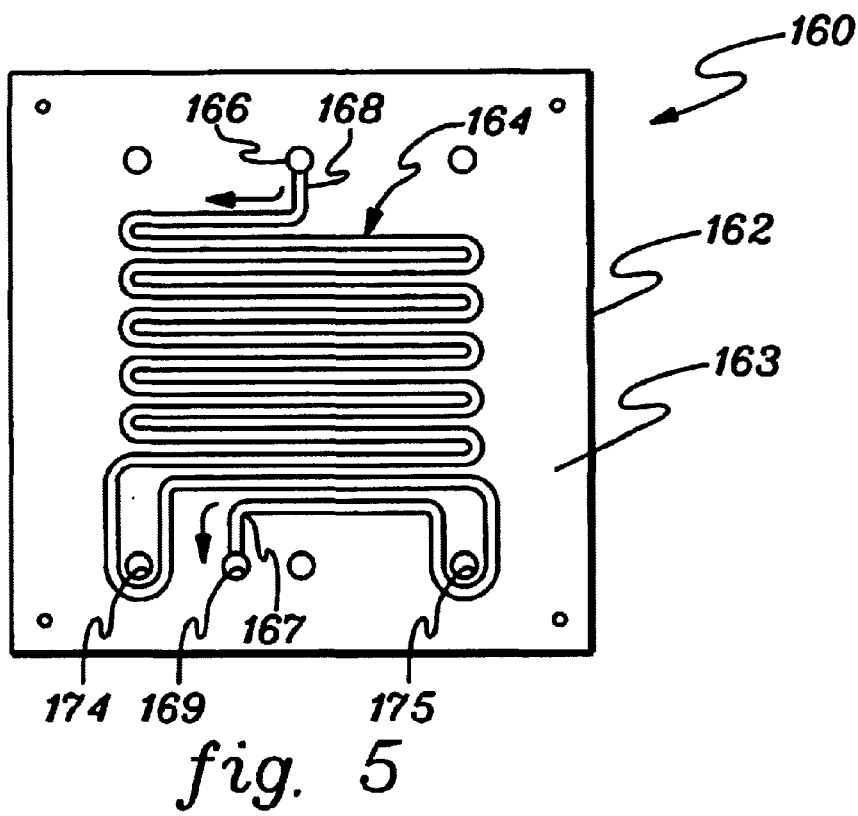
FIG. 5 is an elevational view of an alternative embodiment of a service end plate.

FIG. 5 illustrates a second embodiment of a service end plate 160 comprising a body 162 having a surface 163 which includes at least one flow channel 164 which extends and is disposed around a first opening 174 and a second opening 175 which define a portion of an inlet fluid manifold and a portion of an inlet oxidant manifold, respectively, in fuel cell stack 110 (FIG. 1). In addition, flow channel 164 includes a first end portion 168 which opens onto an opening 166 which forms a portion of outlet coolant manifold 52 (FIG. 1) of fuel cell stack 110 (FIG. 1), and a second end portion 167 which opens onto a discharge opening 169.

As illustrated in FIG. 5, coolant from the outlet coolant manifold in opening 166 enters end portion 168 of flow channel 164, then travels through flow channel 164, and exits via discharge opening 169. Desirably, discharge opening 169 is suitably connected via a conduit to the same heat exchanger for cooling the coolant passing through the fuel cell stack, or alternatively, a separate heat exchanger. Similarly, a blind end plate may be configured to pass coolant from the outlet coolant manifold through the blind end plate. With this configuration of the end plate, the temperature of the coolant introduced into the end plates will more closely approach the maximum operating temperature of the fuel cell stack, e.g., within a few degrees Celsius and desirably within one degree Celsius, so that both the fuel cell stack and the end plates or the desired surfaces and/or portions of the end plates are maintained at substantially the same temperature as the fuel cell stack. From the present description, it will be appreciated by those skilled in the art that the end plates may have separate inlet and outlet openings which connect to the flow channel in the end plates and which do not connect to the inlet or outlet coolant manifold of the fuel cell stack so that a separate heated fluid may be used, e.g., a heated fluid which is not mixed with the coolant passing through the fuel cell stack.

With reference again to FIG. 1, a pair of plates 106 and 107 are disposed between insulation layers 114 and 117 and end plates 120 and 140 to provide a seal for flow channels 124 and 144, respectively. From the present description, it will be appreciated that suitable insulation layers may provide the necessary sealing of the outer portion of flow channel 124 and 144 thereby eliminating the need for plates 106 and 107. Providing flow channels on the end plates and desirably eliminating plates 106 and 107 result in a compact fuel cell assembly design, a reduction in manufacturing costs, and an efficient transfer of heat from the fluid to the end plate and to the ends of the fuel cell stack. End plate 120 and end plate 140 are desirably formed from a metal such as steel or from a plastic such as polypropylene.

From the present description, it will be appreciated by those skilled in the art that suitable insulation layers may be provided between the ends of the fuel cell stack and the end plates so that the operating temperature of the fuel cell stack is generally constant along its length and so that the at least one flow channel of the service end plate need not extend over the active or working area of the fuel cell, but instead extend around the inlet fuel opening and/or the inlet oxidant opening in the service end plate or be disposed adjacent to the inlet fuel opening and/or the inlet oxidant opening in the service end plate to inhibit condensation of the humidified reactant conducted through the inlet fuel opening and/or inlet oxidant opening.

While the flow channels of the end plates are illustrated as a single flow channel extending from an inlet opening to an outlet opening and across the surface of the body of the end plate, from the present description, it will be appreciated by those skilled in the art that multiple or a plurality of flow channels may extend from the inlet opening to the outlet opening. From the present description, it will also be appreciated by those skilled in the art that the flow channels may be configured as passageways extending through the body of the end plate, or a combination of flow channels on a surface and passageways extending through the body of the end plate. It is also appreciated that when coolant is used, the flow channel(s) and/or passageway(s) in the end plates are sized and configured so that desired flow is conducted through the end plates as well as the cooling plates interspersed between the fuel cells throughout the length of the fuel cell stack, i.e., so as to not short circuit the flow of coolant through the end plates.

Figure 6:
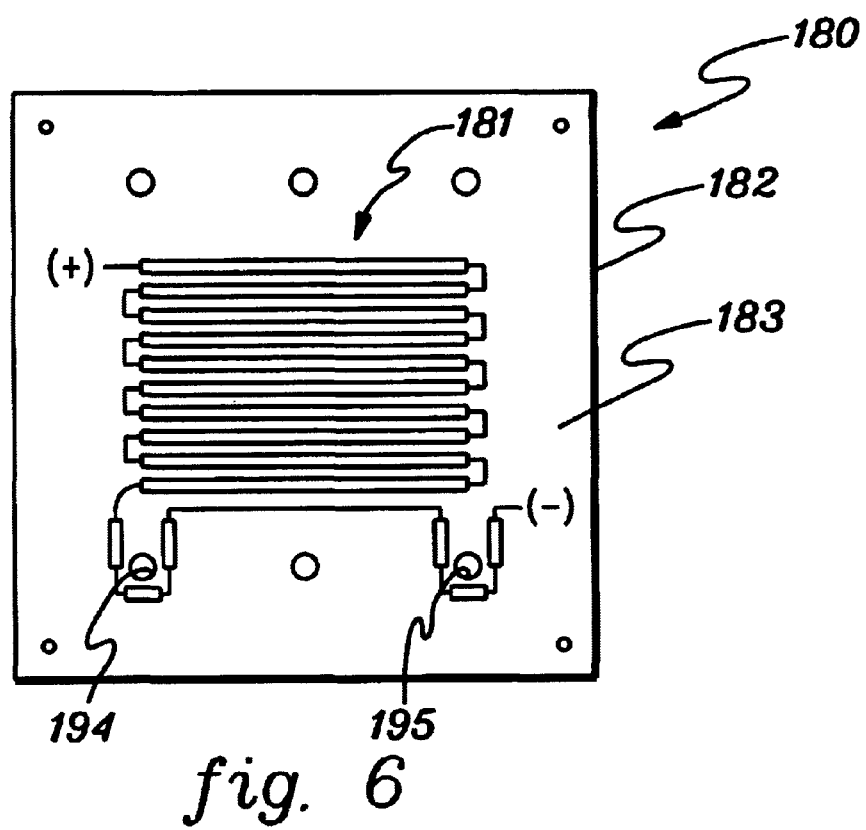
FIG. 6 is an elevational view of another alternative embodiment of a service end plate.

FIG. 6 illustrates an alternative embodiment of a service end plate 180 comprising a body 182 having a surface 183 having disposed thereon a plurality of heating elements 181 for transforming electrical energy into heat, to heat end plate 180 to inhibit condensation of the humidified fuel supply passing through end plate 180 and/or to inhibit heat loss from the end of a fuel cell stack. In this illustrated embodiment, the heating elements 181 extend over substantially an entire portion of surface 183 corresponding to an active area of a fuel cell stack and around an inlet fuel opening 194 and an inlet oxidant opening 195.

The plurality of heating elements 181 are suitably connected to an electrical power supply which is desirably connected to suitable heat sensors for controllably regulating the supply of electrical power to heating elements 181 to maintain end plate 180 or at least the surface of the end plate at the operating temperature of the fuel cell stack. The plurality of heating elements may include suitable electrical resistance heating tape applied to the surface of the end plate corresponding to the active or working area of the fuel cell and/or around one or more of the inlet reactant openings. Similarly, a blind end plate may include a plurality of heating elements extending along the surface of the end plate corresponding to the active or working area of the fuel cell stack. From the present description, it will be appreciated by those skilled in the art that the heating elements may be disposed within or embedded in the body of the end plate.

Although various embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An outermost heatable end plate for use in compressing a fuel cell stack in a fuel cell assembly, the outermost heatable end plate comprising:
   a monolithic body having at least one flow channel formed into the surface of the body; and wherein said at least one flow channel comprises an inlet portion which opens onto at least one of an inlet coolant manifold extending through the fuel cell stack and an outlet coolant manifold extending through the fuel cell stack.

2. The heatable end plate of claim 1 wherein said inlet portion opens onto the inlet coolant manifold extending through the fuel cell stack.

3. The heatable end plate of claim 1 wherein said inlet portion opens onto the outlet coolant manifold extending through the fuel cell stack.

4. The heatable end plate of claim 1 wherein said body comprises a surface engageable with an end of the fuel cell stack, and said at least one flow channel is disposed on said surface and corresponds to an active area of the end of the fuel cell stack.

5. The heatable end plate of claim 1 wherein said body comprises at least one opening extending therethrough for forming a portion of at least one inlet manifold for conducting at least one reactant to the fuel cell stack.

6. The heatable end plate of claim 5 wherein said body comprises a surface engageable with an end of the fuel cell stack, and said at least one flow channel is disposed on said surface and corresponds to an active area of the end of the fuel cell stack.

7. The heatable end plate of claim 5 wherein said at least one flow channel is disposed around said at least one opening.

8. The heatable end plate of claim 5 wherein said body comprises a surface engageable with an end of the fuel cell stack, and said at least one flow channel is disposed on said surface, corresponds to an active area of the end of the fuel cell stack, and is disposed around said at least one opening.

9. The heatable end plate of claim 1 wherein said body comprises a first opening extending therethrough for forming a portion of an inlet fuel manifold for conducting fuel to the fuel cell stack, and a second opening extending therethrough for forming a portion of an inlet oxidant manifold for conducting oxidant to the fuel cell stack.

10. The heatable end plate of claim 9 wherein said body comprises a surface engageable with an end of the fuel cell stack, and said at least one flow channel is disposed on said surface and corresponds to an active area of the end of the fuel cell stack.

11. The heatable end plate of claim 9 wherein said at least one flow channel is disposed around said first opening and said second opening.

12. The heatable end plate of claim 9 wherein said body comprises a surface engageable with an end of the fuel cell stack, and said at least one flow channel is disposed on said surface, corresponds to an active area of the end of the fuel cell stack, and is disposed around said first opening and said second opening.

13. A fuel cell assembly comprising:

a fuel cell stack;

a first outermost heatable end plate attached to a second end plate for compressing said fuel cell stack therebetween;

said first outermost heatable end plate comprising a first monolithic body having at least one first flow channel formed into the surface of the body; and wherein said at least one first flow channel comprises an inlet portion which opens onto at least one of an inlet coolant manifold extending through the fuel cell stack and an outlet coolant manifold extending through the fuel cell stack.

14. The fuel cell assembly of claim 13 wherein said inlet portion opens onto the inlet coolant manifold extending through the fuel cell stack.

15. The fuel cell assembly of claim 13 wherein said inlet portion opens onto the outlet coolant manifold extending through the fuel cell stack.

16. The fuel cell assembly of claim 13 wherein said second end plate comprises a second outermost heatable end plate comprising a second monolithic body having at least one second flow channel.

17. The fuel cell assembly of claim 16 wherein said first body comprises a first surface engaged with a first end of said fuel cell stack, and said at least one first flow channel is disposed on said first surface and corresponds to an active area of the end of said fuel cell stack, and said second body comprises a second surface engaged with a second opposite end of said fuel cell stack, and said at least one second flow channel is disposed on said second surface and corresponds to the active area of the end of said fuel cell stack.

18. The fuel cell assembly of claim 13 wherein said first body comprises at least one opening extending therethrough for forming a portion of at least one inlet manifold for conducting at least one reactant to said fuel cell stack.

19. The fuel cell assembly of claim 18 wherein said flow channel is disposed around said at least one opening.

20. The fuel cell assembly of claim 13 wherein said fuel cell stack comprises a plurality of PEM fuel cells.

* * * * *